United States Patent
Kageyama et al.

(10) Patent No.: US 7,573,377 B2
(45) Date of Patent: Aug. 11, 2009

(54) MOVING DISPLAY APPARATUS FOR A VEHICLE

(75) Inventors: Hideaki Kageyama, Shizuoka (JP); Yoshiyuki Furuya, Shizuoka (JP); Masahiko Mio, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 355 days.

(21) Appl. No.: 11/517,372

(22) Filed: Sep. 8, 2006

(65) Prior Publication Data

US 2007/0115107 A1 May 24, 2007

(30) Foreign Application Priority Data

Nov. 18, 2005 (JP) ............................. 2005-333736

(51) Int. Cl.
*G09F 9/00* (2006.01)
(52) U.S. Cl. ................ 340/461; 340/438; 340/459; 340/462
(58) Field of Classification Search ................ 340/438, 340/459, 461, 517, 462; 362/459; 345/1.1–3.4, 345/7, 204, 698
See application file for complete search history.

(56) References Cited

U.S. PATENT DOCUMENTS

| | | | | |
|---|---|---|---|---|
| 4,147,017 A | * | 4/1979 | Cortopassi et al. | ............ 56/16.5 |
| 5,949,345 A | * | 9/1999 | Beckert et al. | ......... 340/815.41 |
| 6,225,892 B1 | * | 5/2001 | Chene | ......................... 340/438 |
| 7,289,085 B2 | * | 10/2007 | Adams et al. | ................... 345/7 |
| 2004/0195987 A1 | * | 10/2004 | Hayasaka | ................... 318/432 |
| 2005/0195175 A1 | * | 9/2005 | Anderson | ................... 345/204 |
| 2005/0212669 A1 | * | 9/2005 | Ono et al. | .................... 340/461 |
| 2006/0164230 A1 | * | 7/2006 | DeWind et al. | .............. 340/461 |

FOREIGN PATENT DOCUMENTS

JP 2005-241626 9/2005

* cited by examiner

*Primary Examiner*—Daniel Wu
*Assistant Examiner*—Ryan W Sherwin
(74) *Attorney, Agent, or Firm*—Finnegan, Henderson, Farabow, Garrett & Dunner, L.L.P.

(57) ABSTRACT

When a CPU judges that a vehicle is stopped, a display image surrounded by a separator is displayed in such a first quality that a driver can watch while the display image is moving from a first display area to a second display area, and the motor is driven in a relatively low first speed to move the separator. When the CPU judges that the vehicle is running, the separator is rapidly moved and data about the vehicle such as warning is rapidly displayed.

3 Claims, 7 Drawing Sheets

MOVING DISPLAY APPARATUS FOR A VEHICLE

CROSS REFERENCE TO RELATED APPLICATIONS

This application is based on Japanese Patent Application No. 2005-333736, the contents of which are hereby incorporated by reference.

BACKGROUND OF THE INVENTION

1. Field of the Invention

The present invention relates to a display apparatus for a vehicle, in particular, to a display apparatus for a vehicle having an LCD display.

2. Description of the Related Art

Japanese Patent Application No. 2005-241626 discloses a display apparatus 1 for a vehicle having a ring-shaped separator 53 movably disposed in front of a display screen of an LCD display for surrounding a part of the display screen.

As shown in FIG. 1, the ring-shaped separator 53 is disposed on the display apparatus 1. The separator 53 is movable between positions shown in FIGS. 1 and 2. Even while the separator is moved, the display image 56 displayed in the separator 53 is visible in a specific image quality. As shown in FIGS. 1 and 2, the images displayed on the area except the area surrounded by the separator 53 can be changed. For example, FIG. 1 shows an oil pressure meter area 62, an oil temperature meter area 63, a fuel meter area 64, and a water temperature meter 65, while FIG. 2 shows a bar indicator 66.

As shown in FIGS. 3 and 4, the separator 53 is movable owing to a transferring mechanism 67. The transferring mechanism 67 includes a folded frame 68, a motor 69, and a transmission 70 for transmitting the driving force of the motor 69 to the folded frame 68. As shown in FIG. 3, the transmission 70 includes a gear 70a fixed to a rotating shaft of the motor 69, a gear 70b engaged with the gear 70a, a pinion 70d to which a rotation of the gear 70b is transmitted by a belt 70c, and a rack 70e for converting the rotation to a linear motion parallel to a major axis.

However, there is a problem that a noise occurs when the separator 53 is moved, because the gears 70a, 70b and pinion 70d are engaged with each other and rotated by the motor 69. Further, quality of the display image 56 when the separator 53 is moved is required to be improved.

Accordingly, an object of the present invention is to provide a quiet display apparatus for a vehicle with a high quality display image.

SUMMARY OF THE INVENTION

In order to attain the object, according to the present invention, there is provided a display apparatus for a vehicle including:

a display device for displaying data about the vehicle;

a display controller for controlling in such a way that according to a predetermined signal, a first data about the vehicle displayed on a first display area is shifted to a second display area, and a second data about the vehicle is displayed on the first display area;

a display separator surrounding the first display data for separating the first display data from the other data;

a movement controller for moving the separator synchronized with the first data by driving a motor connected to the separator through gears in predetermined speed and torque; and a judging device for judging whether the vehicle is moving or not moving wherein when the judging device judges that the vehicle is stopping, the display controller controls that while the first data is moved from the first data area to the second data area, the first data is displayed in a first image quality which allows a driver to watch the first data, and the movement controller controls the motor in a first lower speed for moving the separator, wherein when the judging device judges that the vehicle is moving, the display controller controls that while the first data is moved from the first data area to the second data area, the first data is displayed in a second image quality lower than the first image quality, and the movement controller controls the motor in a second higher speed for moving the separator.

According to the above, when the vehicle is judged not moving the motor rotates in a relatively low speed so that the noise is reduced. When the vehicle is judged moving, the separator is swiftly moved, and the second data about the vehicle such as warning is rapidly recognized.

Preferably, when the vehicle is judged not moving, the motor is driven in a lower torque for moving the separator than when the vehicle is judged moving.

According to the above, when the vehicle is judged not moving the motor is driven in the lower torque so that a driving force for gears is reduced and the noise is reduced.

Preferably, the display apparatus further includes a thermometer for detecting a temperature around the movement controller, and when the thermometer detects such a low temperature that the separator couldn't move smoothly, the movement controller controls that the motor is driven in a higher torque than when the thermometer detects more than such a low temperature.

According to the above, when the movement controller is in such a low temperature that the separator couldn't move smoothly, the motor is driven in a high torque. Therefore, even when in such a low temperature, the separator surely moves.

These and other objects, features, and advantages of the present invention will become more apparent upon reading of the following detailed description along with the accompanied drawings.

DETAILED DESCRIPTION OF THE PREFERRED EMBODIMENTS

An embodiment of a display apparatus for a vehicle 1 according to the present invention will be explained with reference to figures.

Figure 1:
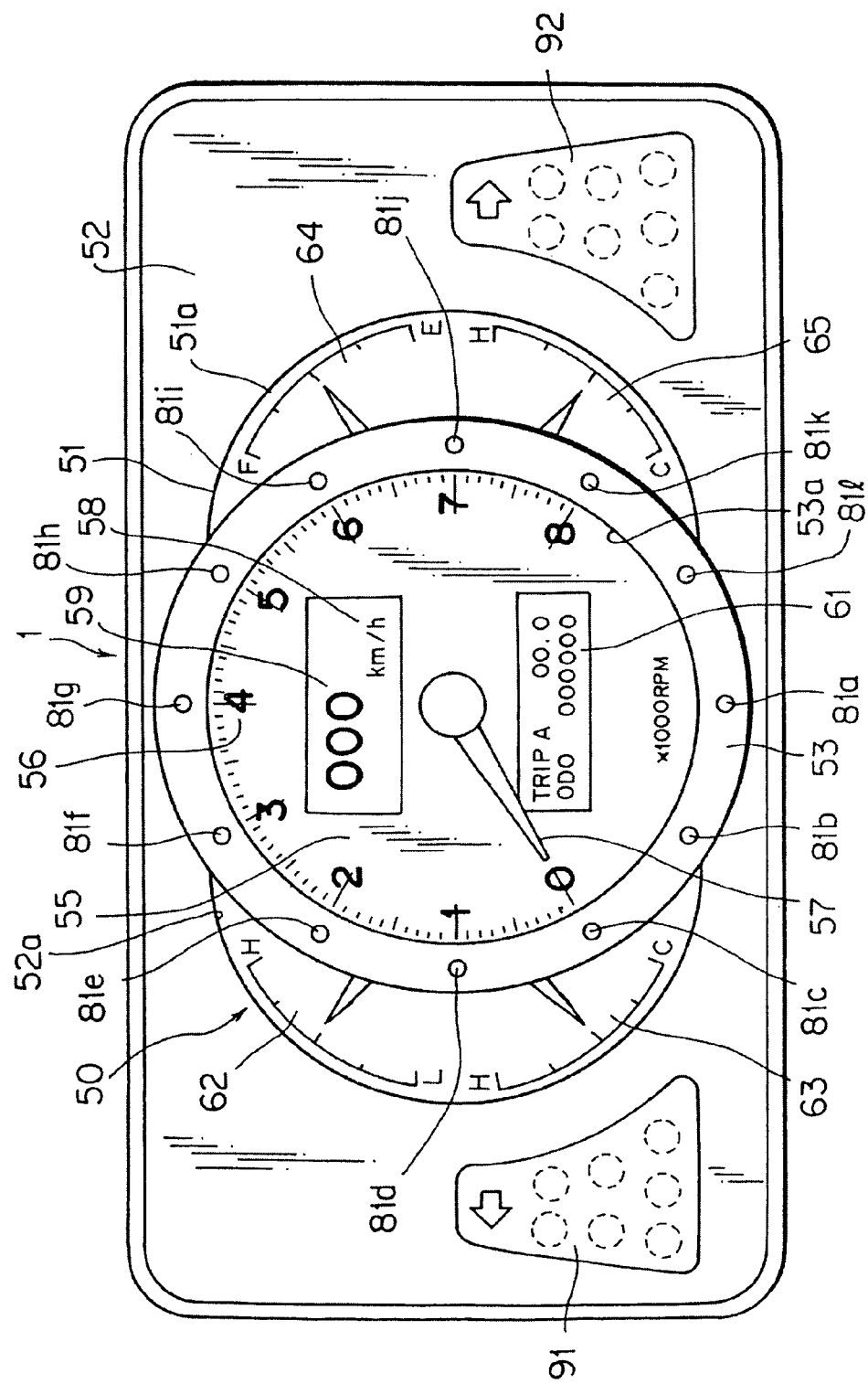
FIG. 1 is a front view showing an embodiment of a display apparatus for a vehicle according to the present invention.

As shown in FIG. 1, a graphic meter 50 is disposed in the center of the display apparatus 1. Warning indicators 91, 92 are disposed respectively at left and right sides of the display apparatus 1.

The graphic meter 50 includes a liquid crystal display (LCD) display device 51, a bezel 52 partially covering the LCD 51, and a separator 53 disposed in front of the LCD 51 and the bezel 52. The LCD 51 is formed in a substantially rectangular shape. However, because the bezel 52 covering the LCD 51, a view area of the LCD 51 is substantially an oval. The various data indicating conditions of a vehicle can be displayed on the LCD 51.

The separator 53 is disposed at substantially the center of the oval image area of the LCD 51. The separator 53 is made of an opaque plastic material, formed in a ring shape, having a circular opening at the center thereof. A lens 55 may be engaged with the opening. The lens 55 may be convex or concave, and in this case, a convex lens is used. Twelve light emitting diodes (LED) 81a to 81l are mounted on the separator 53.

A display image 56 corresponding to a circular dial plate for indicating measured data of the vehicle is displayed on a first display area surrounded by the separator 53. The display image 56 is a tachometer as a first data about the vehicle. Graduations of the tachometer are displayed on an outer periphery of the display image 56. Further, a pointer 57 rotating corresponding to a number of rotations of an engine is also displayed. The display image 56 and the pointer 57 compose an analog indicator.

A sub display area 58 for displaying data except the tachometer is disposed around the center of the display image 56. For example, a speedometer display area 59 and an odo/trip meter display area 61 are disposed in the sub display area 58.

In the display screen of the LCD 51 surrounded by the left side of the separator 53 and the bezel 52, for example, an oil pressure meter display area 62 and an oil temperature meter 63 are disposed.

In the display screen of the LCD 51 surrounded by the right side of the separator 53 and the bezel 52, for example, a fuel meter display area 64 and a water temperature display area 65 are disposed. The fuel meter display area 64 and the water temperature display area 65 compose the second display area in claims.

The separator 53 can be moved left and right.

Figure 2:
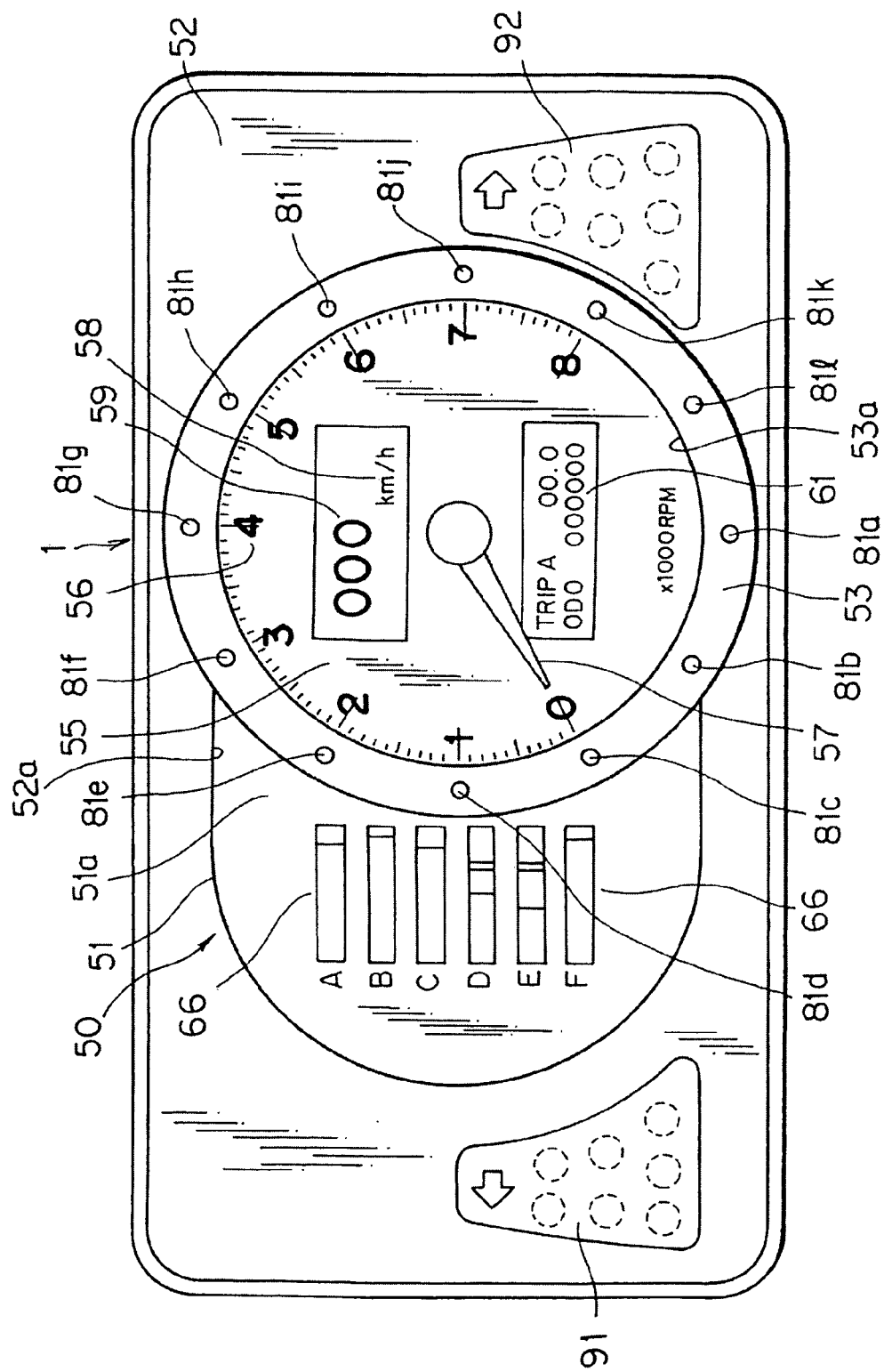
FIG. 2 is a front view showing the display apparatus for a vehicle according to the present invention.
Figure 3:
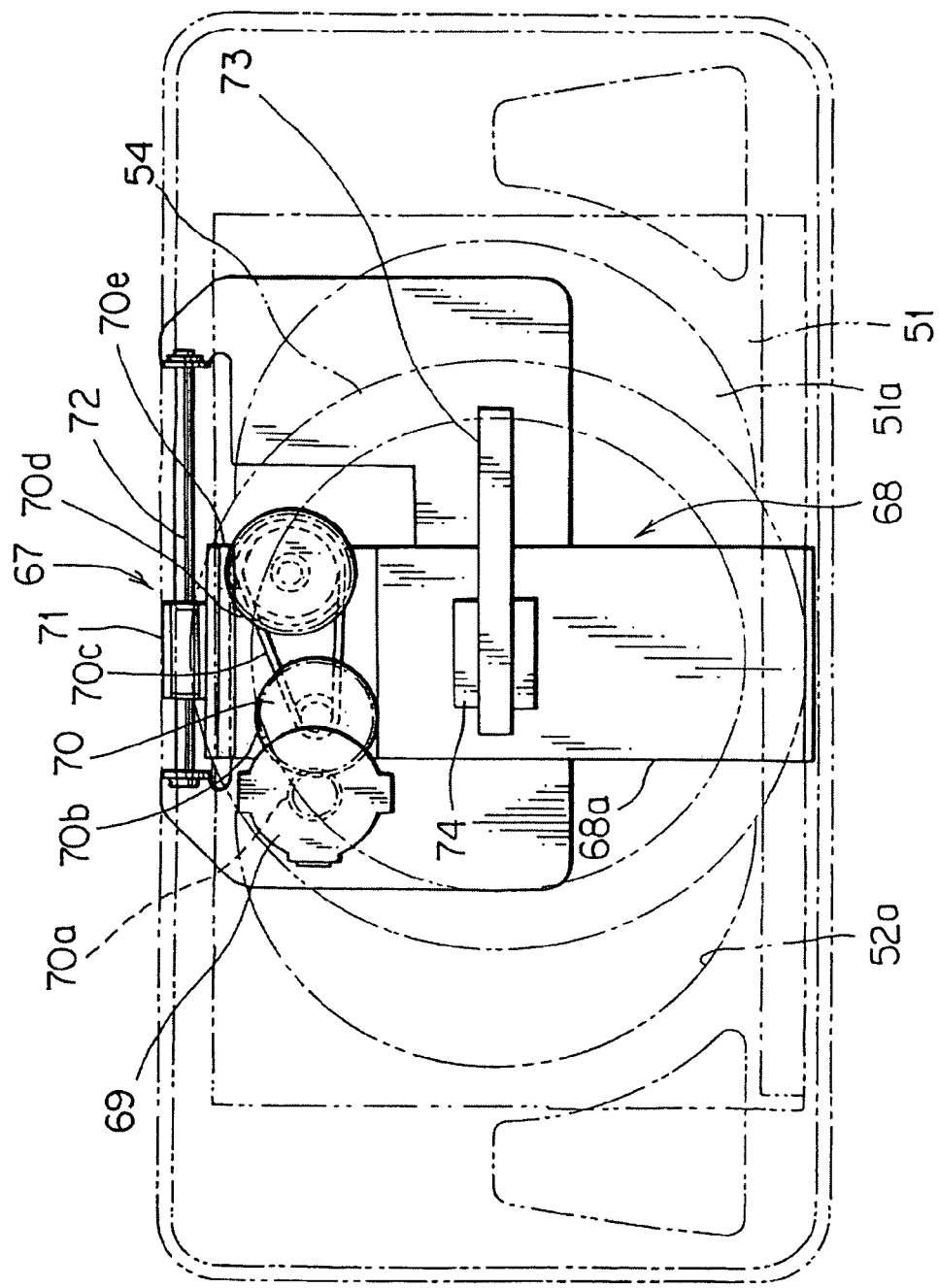
FIG. 3 is a front perspective view showing an inner structure of the display apparatus for a vehicle shown in FIGS. 1 and 2.
Figure 4:
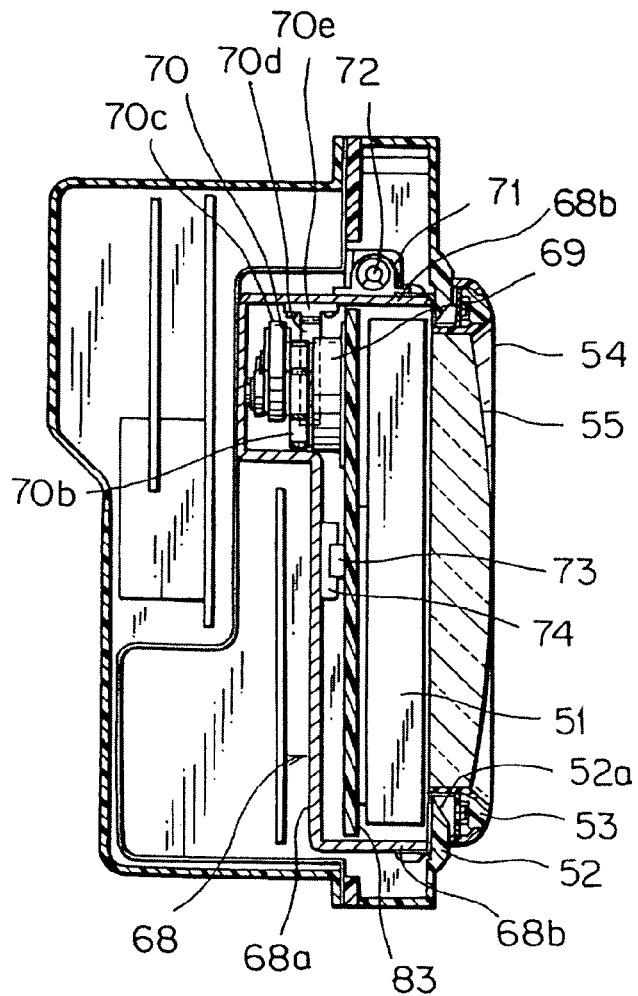
FIG. 4 is a left perspective view showing an inner structure of the display apparatus for a vehicle shown in FIGS. 1 and 2.

As shown in FIG. 2, the separator 53 is moved to a right end of the LCD 51. As synchronized with the movement of the separator 53, the display image 56 is moved from the center to the right end. After the display image 56 is moved, the separator 53 surrounds the display image 56 as same as before the movement began.

When the separator 53 and the display image 56 start moving, the display areas 62, 63, 64, 65 are deleted. After the separator 53 and the display image 56 are moved, data 66 except the above (corresponding to the second data about the vehicle in claims) is displayed on the left side of the display screen. For example, as shown in FIG. 2, an oil level, a brake fluid level, a coolant level, an exhaust gas temperature, an intake gas temperature, a washer level are displayed.

Next, a structure of a transferring mechanism 67 for moving the separator 53 will be explained with reference to FIGS. 1 to 4.

The transferring mechanism 67 includes a folded frame 68 extending along a back wall of the LCD 51, a motor 69 disposed on a back wall of a base plate 83, and a transmission 70 for transmitting the driving force of the motor 69 to the frame 68. The transferring mechanism 67 also includes a first supporting member 71 for supporting a part of the frame 68 at a top of the LCD 51, a shaft 72 disposed on a housing of the display apparatus 1 substantially parallel to a longitudinal direction of the oval display screen and slidably engaged with the first supporting member 71, a rail 73 disposed on a back side of the base plate 83 substantially parallel to a longitudinal direction of the oval display screen, and a second supporting member 74 fixed to the frame 68 and having a guide wall for guiding the rail 73.

The transmission 70 includes a gear 70a fixed to a rotating shaft of the motor 69, a gear 70b engaged with the gear 70a, a pinion 70d to which a rotation of the gear 70b is transmitted by a belt 70c, and a rack 70e for converting the rotation to a linear motion parallel to a major axis.

Figure 5:
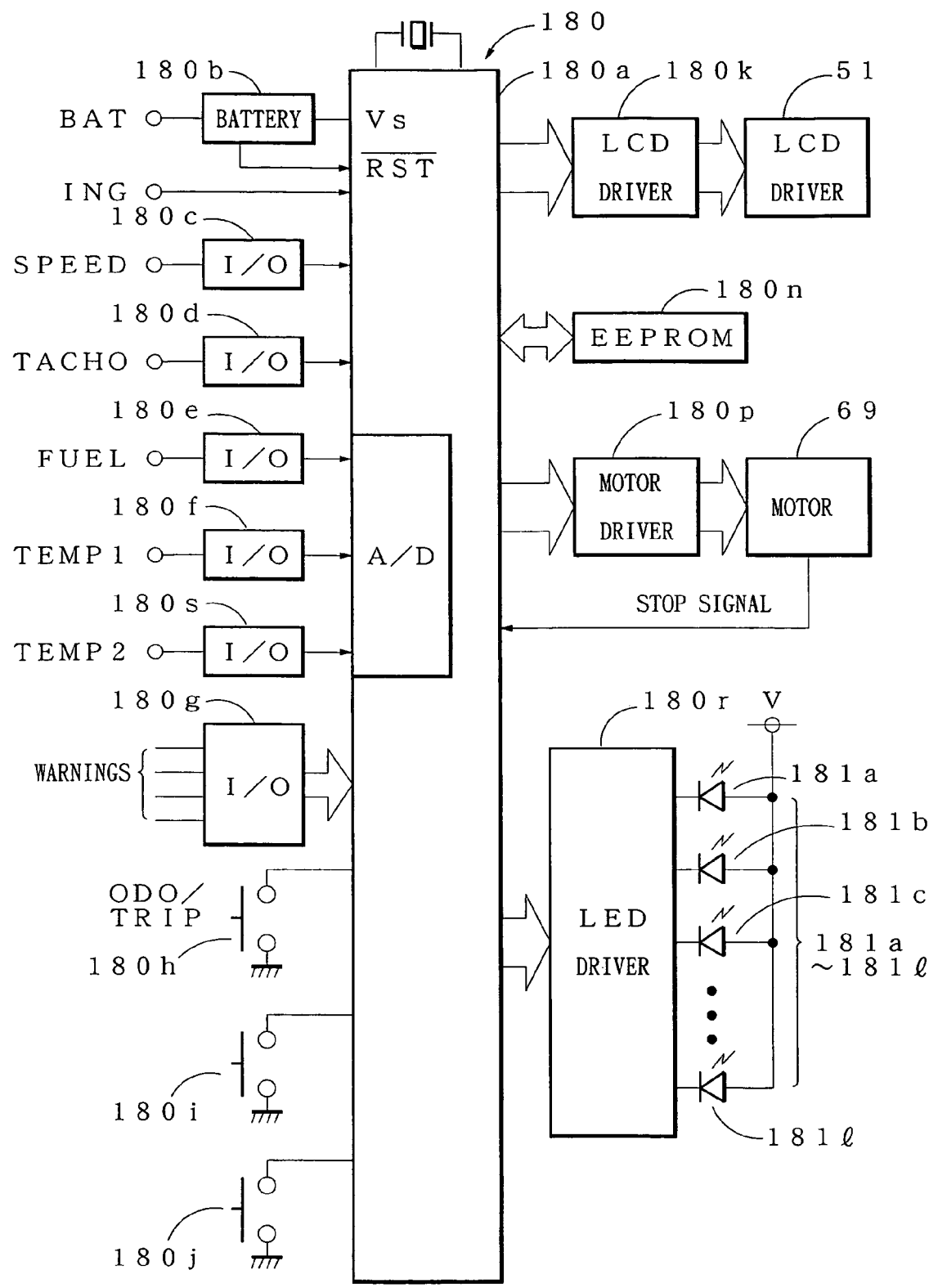
FIG. 5 is a block diagram showing main parts of an electric structure of a controller.

Next, an electric structure of the display apparatus 1 for a vehicle will be explained with reference to FIGS. 5 and 6.

A controller 180 is connected to a display controller, a movement controller, a microcomputer (CPU) 180a as a judgement device, and a not-shown battery. The controller 180 includes a power supply 180b, an input/output circuit 180c for inputting a signal from a vehicle speed sensor (not shown), an input/output circuit 180d for inputting a signal from a tachometer, an input/output circuit 180e for inputting a signal from a fuel meter, an input/output circuit 180f for inputting a signal from a water temperature sensor, and an input/output circuit 180s for inputting a signal from a temperature sensor sensing the transmission 70, an input/output circuit 180g for the other sensor, a switch 180h for switching an odd/trip meter, a switch 180i for switching a signal for moving the separator 53, a switch 180j for switching LEDs embedded in the separator 53, an LCD driver 180k for inputting various display data outputted from the CPU 180a and for driving the thin film transistor (TFT) type LCD 51 (namely, the graphic meter), an electrically programmable read-only memory (EEPROM) 180n, a motor driver 180p for driving the motor 69, and an LED driver 180r for driving the LEDs embedded in the separator 53.

The motor 69 is a well-known stepper motor. As shown in FIG. 6, supplying pulses to a rotor 69a from an energized coil 69b drives the stepper motor. The stepper motor includes a coil 69c for detecting induced voltage. The coil 69c is not energized and in an open state, and generates an induced voltage corresponding to the rotation of the rotor 69a. If the induced voltage is larger than a threshold voltage, the rotor 69a is rotated. Therefore, the induced voltage is used for detecting the rotation of the motor 69, and inputted into the CPU 180a.

In the EEPROM 180n, a standard number of the energizing steps for moving the separator 53 from a start position to a stop position is previously stored.

Next, a data processing of the CPU 180a will be explained with reference to FIGS. 7 and 8. FIG. 8 is a flow chart showing a subroutine of a data processing shown in FIG. 7.

First, when a power of the display apparatus 1 is on, each part of the controller 180 is initialized (step S11). Next, a position of the separator 53 is determined (step S12). Then, the display areas of the LCD 51 are set (step S13). Then, various detecting signals are inputted (step S14). Next, an initial image is displayed on the graphic meter 50 (step S15). As this initial image, for example, an image shown in FIG. 1 is displayed. The display image 56 and the pointer 57 are displayed corresponding to the number of revolutions of an engine. Bar indicators are displayed corresponding to measured values on the display areas 62, 63, 64, 65.

Next, whether a signal for moving the separator 53 is outputted or not is judged (step S16). This judgement is done according to a manual switch 180i or an automatic switch for emergency. This switch for emergency is, for example, on when the water temperature is abnormal (switch 180g is on).

When the signal is not outputted from the switch 180i or the emergency switch ("N" in step S16), the processing goes back to step S14. In this case, by steps S14 and S15, various detecting data is inputted and the initial image is updated.

When "Y" in step S16, a moving mode of the LCD 51 is established (step S17).

In the moving mode, as shown in FIG. 8, firstly, temperature sensor data is inputted (step S171) and whether the temperature is a ultra-low temperature or not is judged (step S172). The ultra-low temperature is, for example, forty degrees centigrade below zero. At this temperature, lubricating oil of the gears in the transmission 70 is frozen, and resistance between the gears are remarkably increased.

When judged as the ultra-low temperature ("Y" in step S172), the motor 69 is to be driven in a low speed and high torque (step S173). Further, data for setting a low quality image (step S174) is stored in the EEPROM 180n. Here, high torque means a torque of the transmission 70 for driving the separator 53 normally even at the ultra-low temperature. In this case, the movement of the separator 53 takes priority over reduction of noise. Further, the movement of the separator 53 takes priority over the speed of the separator 53. Further, the movement of the separator 53 takes priority over the quality of the display image 56. For example, three dots per frame is enough.

Figure 6:
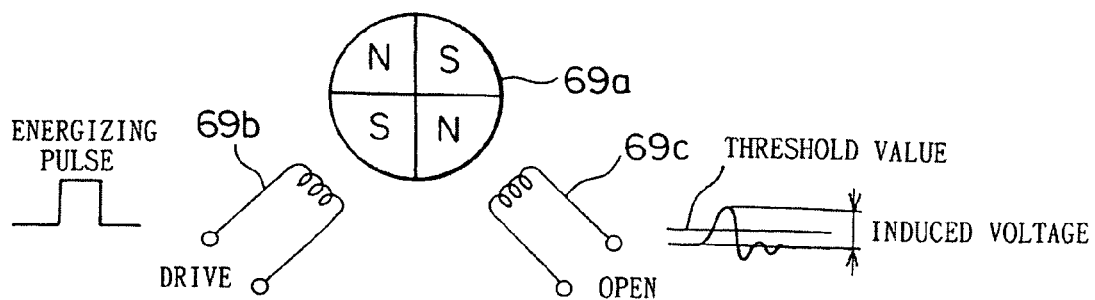
FIG. 6 is an explanatory view for explaining a structure of a motor.

For adjusting the torque, for example, pulse width or duty ratio of the energizing pulse shown in FIG. 6 is adjusted. For adjusting the speed of the motor 69, for example, a frequency of the energizing pulse shown in FIG. 6 is adjusted.

When the temperature is not judged ultra-low ("N" in step S172), whether the vehicle having the display apparatus 1 is moving or not moving is judged (step S175). The judgement is done according to the signal from the speed sensor. When judged not moving ("N" in step S175), the motor 69 is to be driven in low speed and low torque (step S176), a high quality image is selected (step S177), and data about the moving mode is set in the EEPROM 180n. When judged moving ("Y" in step S175), the motor is to be driven in high speed and high torque (step S178), a low quality image is selected, and data about the moving mode is set in the EEPROM 180n.

More precisely, when judged not moving ("N" in step S175), for putting being silent ahead, the motor is to be rotated in a lower speed and a lower torque. Also, the quality of the display image 56 surrounded by the separator 53 is high, for example, two dots per frame.

When judged moving ("Y" in step S175), for putting the safety ahead, the motor is to be rotated in a high speed. Thus, the separator 53 is rapidly moved and stopped, so that visibility of the display image 56 is improved and bar indicators 66 is rapidly displayed. While the separator 53 is moving, the image quality of the display image 56 is low, for example, three dots per frame.

Figure 7:
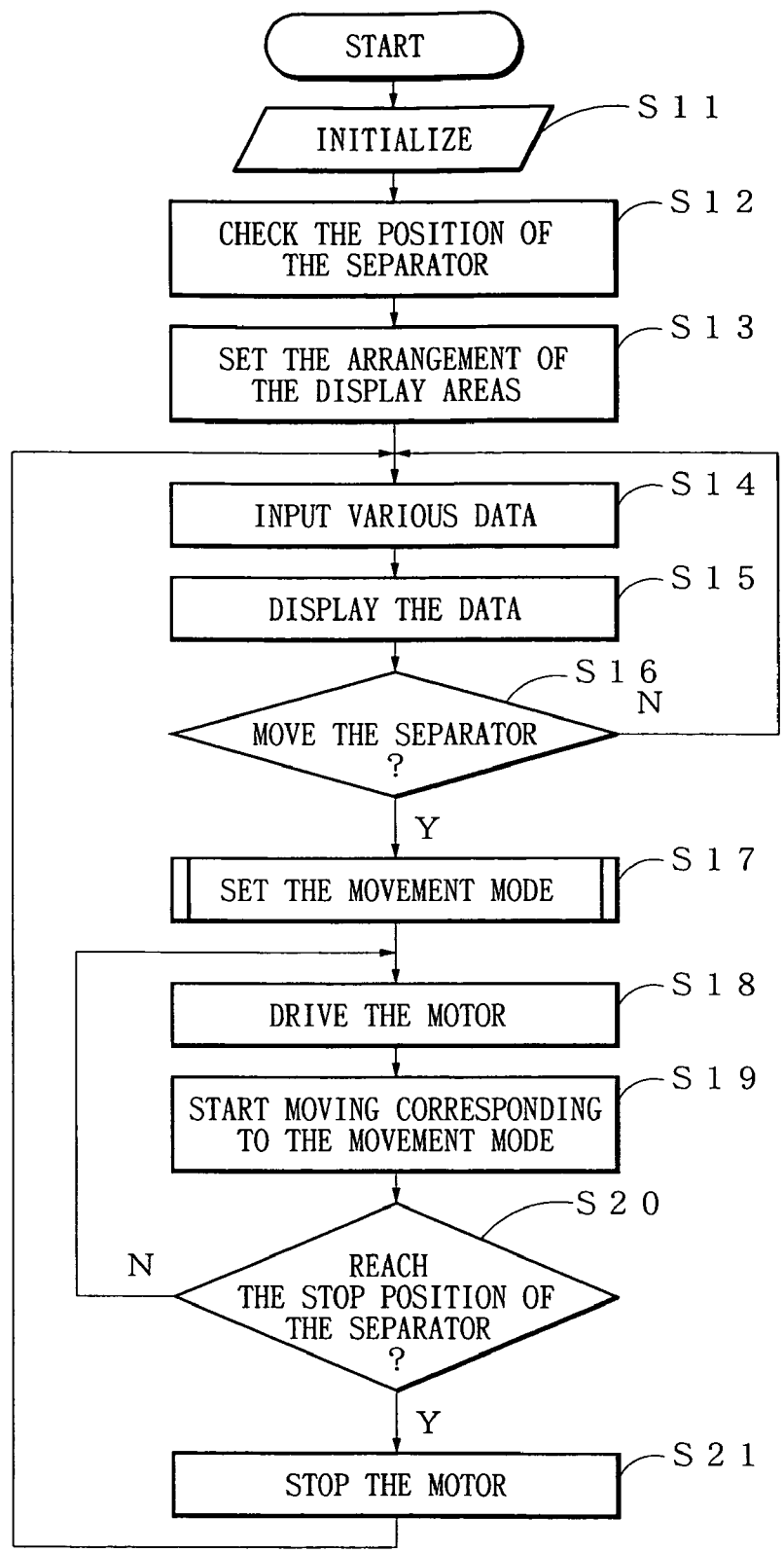
FIG. 7 is a flow chart showing a process flow according to an embodiment of the present invention.
Figure 8:
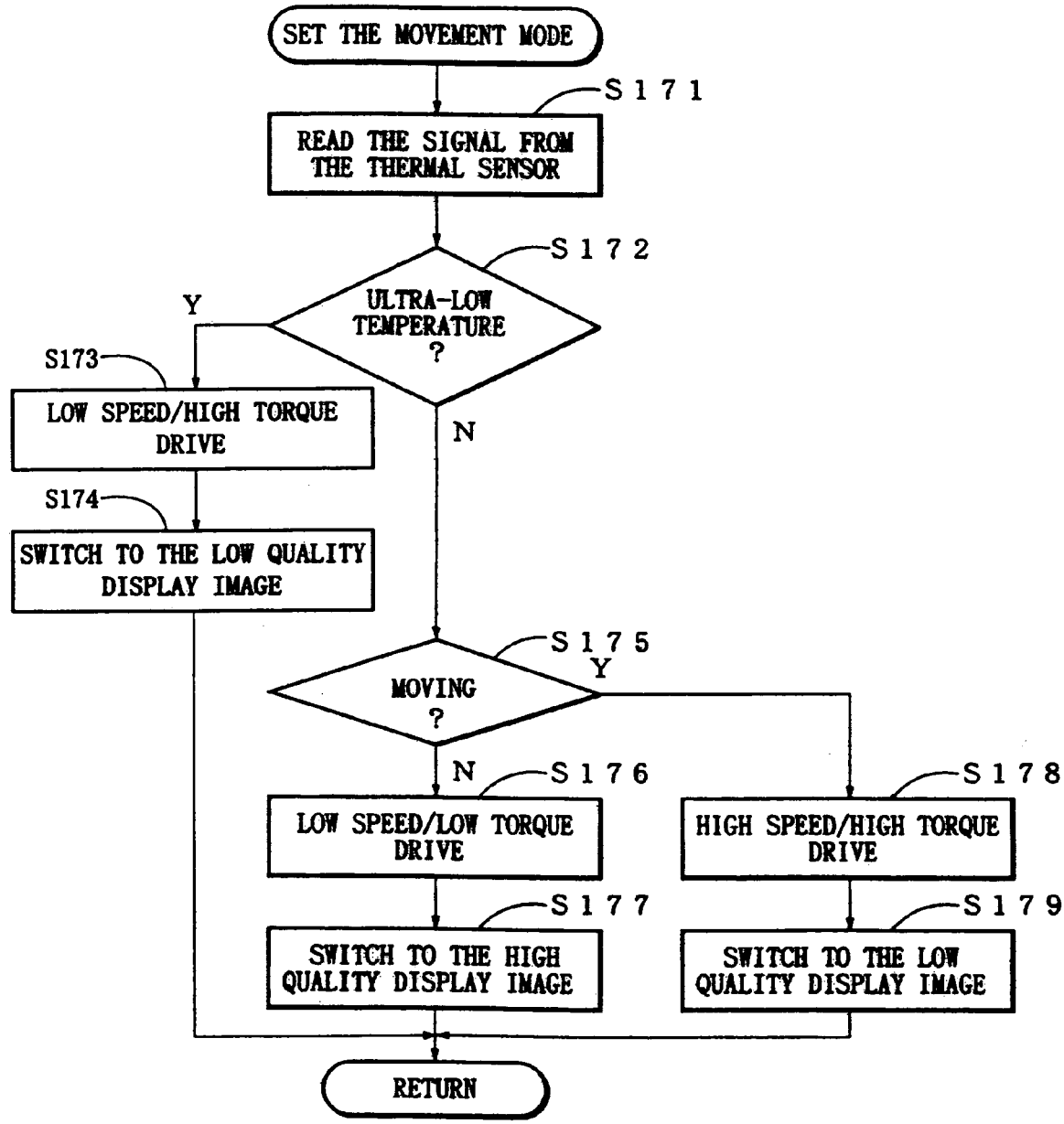
FIG. 8 is a flow chart showing a process flow according to an embodiment of the present invention.

After the data about the moving mode is set, the processing goes back to step S18 in FIG. 7.

In FIG. 7, the motor is started to be driven (step S18). At the transferring mechanism 67, the rotation of the motor 69 is transmitted to the pinion 70d through the gears 70a, 70b and the belt 70c. Then, the rotation of the pinion 70d is converted to a linear movement by the rack 70e so that the frame 78 is moved straight. At this time, because the frame 68 is supported by a first supporting member 71 movably engaged with the shaft 72 and a second supporting member 74 having a guiding groove for guiding the rail 73, the frame 68 is moved right in FIG. 1. Accompanying with the movement of the frame 68, the separator 53 is moved from the center to the right side of the display screen of the LCD 51.

Next, the separator 53 is started to be moved according to the moving mode set at step S17 (step S19). Owing to this, synchronized with the movement of the separator 53, the display image 56 and the pointer 57 are moved from the center to the right. Before the display image 56 and the pointer 57 are moved, the display areas 62, 63, 64, 65 are deleted.

The image quality, the moving speed, and the torque of the display image 56 and the pointer 57 are one of the three way mentioned above.

Next, whether the separator 53 is moved to a goal or not is judged (step S20). This judgement is done by comparison between a counting number of the energized steps and the number of the standard steps. When the number of the energized steps is equal to the number of the standard steps, the separator is judged reaching the goal. When "N" in step S20, the processing goes back to step S18. When "Y" in step S20, the processing goes to step S21 and the motor 69 is stopped. Then, the process goes back to step S14.

When the separator 53 is stopped, the display image 56 and the pointer 57 are surrounded by the separator 53. Further, the bar indicators 66 are displayed. In step S16, when the emergency mode is set because of the water temperature trouble, the display mode of the water temperature bar is different from the other bar indicators, for example, color or blinking.

Next, after the separator 53 is stopped, when the switch 180i is on again ("Y" in step S16), the motor is moved backward and the display data is reset according to steps S17 to S20. In this case, the moving mode is corresponding to an updated data.

According to the above, when the vehicle is stopped, the silent and high quality data owing to the low speed and the low torque is achieved. When the vehicle is moving, the separator 53 is rapidly moved and the safety is attained. When the display apparatus 1 is in the ultra-low temperature, the motor is driven in a high torque. Therefore, the separator 53 is surely moved.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An apparatus for a vehicle comprising:
   a display device for displaying first vehicle data and second vehicle data;
   a display controller for controlling the display of the first vehicle data and the second vehicle data;
   a separator surrounding the first vehicle data;
   a movement controller for moving the separator;
   a judging device for judging whether the vehicle is moving or not moving;

wherein when the judging device judges that the vehicle is not moving, the movement controller moves the separator at a first speed to a side of the display device, and the display controller displays the first data at a first image quality; and wherein when the judging device judges that the vehicle is moving, the movement controller moves the separator at a second higher speed to a side of the display device, and the display controller displays the first data at a second image quality lower than the first image quality.

2. The display apparatus for a vehicle of claim 1, wherein when the judging device judges that the vehicle is not moving, a motor moving the separator is driven at a low torque.

3. The apparatus for a vehicle of claim 1, further comprising a thermometer for detecting a temperature around the movement controller, wherein when the thermometer detects a low temperature, a motor moving the separator is driven at a high torque.

* * * * *